Oct. 5, 1926.
T. B. HUESTIS
1,602,228
CEMENTING MACHINE
Filed May 6, 1922 2 Sheets-Sheet 1
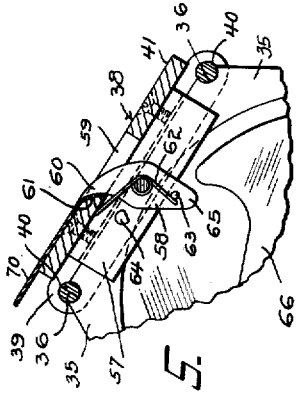
Fig. 5.
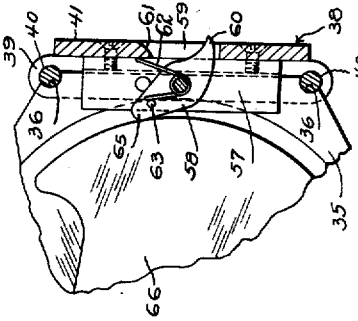
Fig. 6.
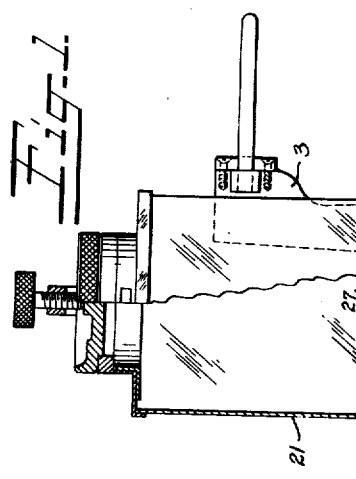
Fig. 1.
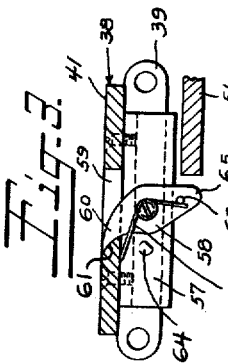
Fig. 3.
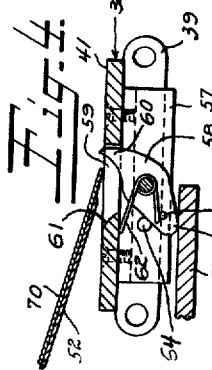
Fig. 4.
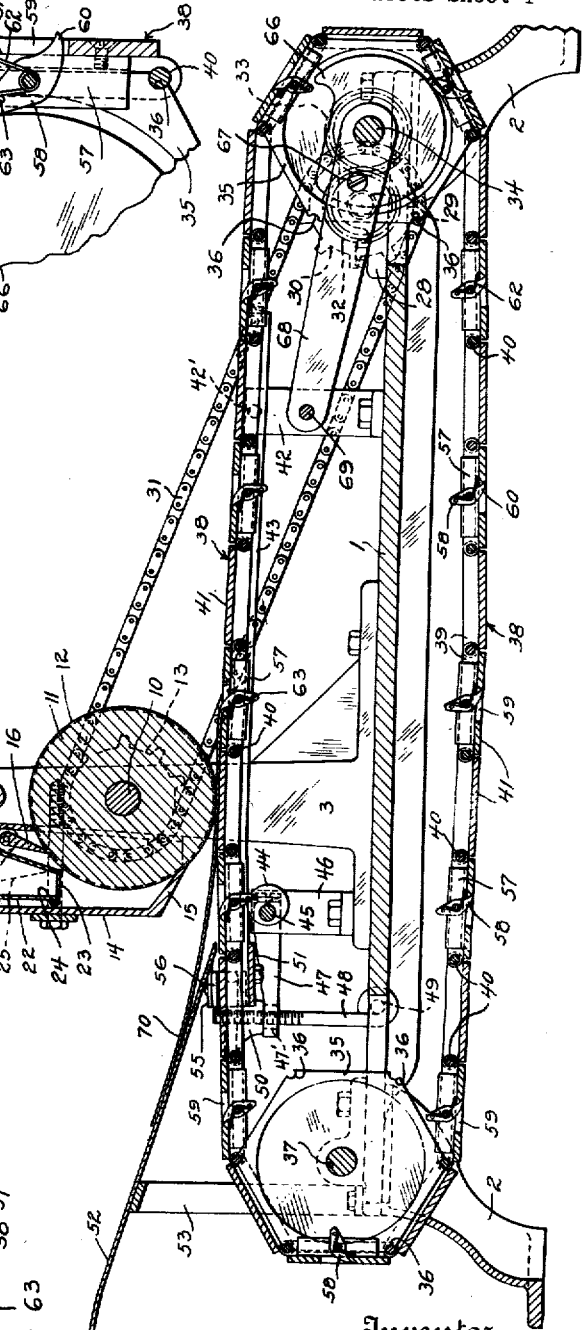
Inventor
Thomas B. Huestis
By his Attorney
Ernest Hopkinson

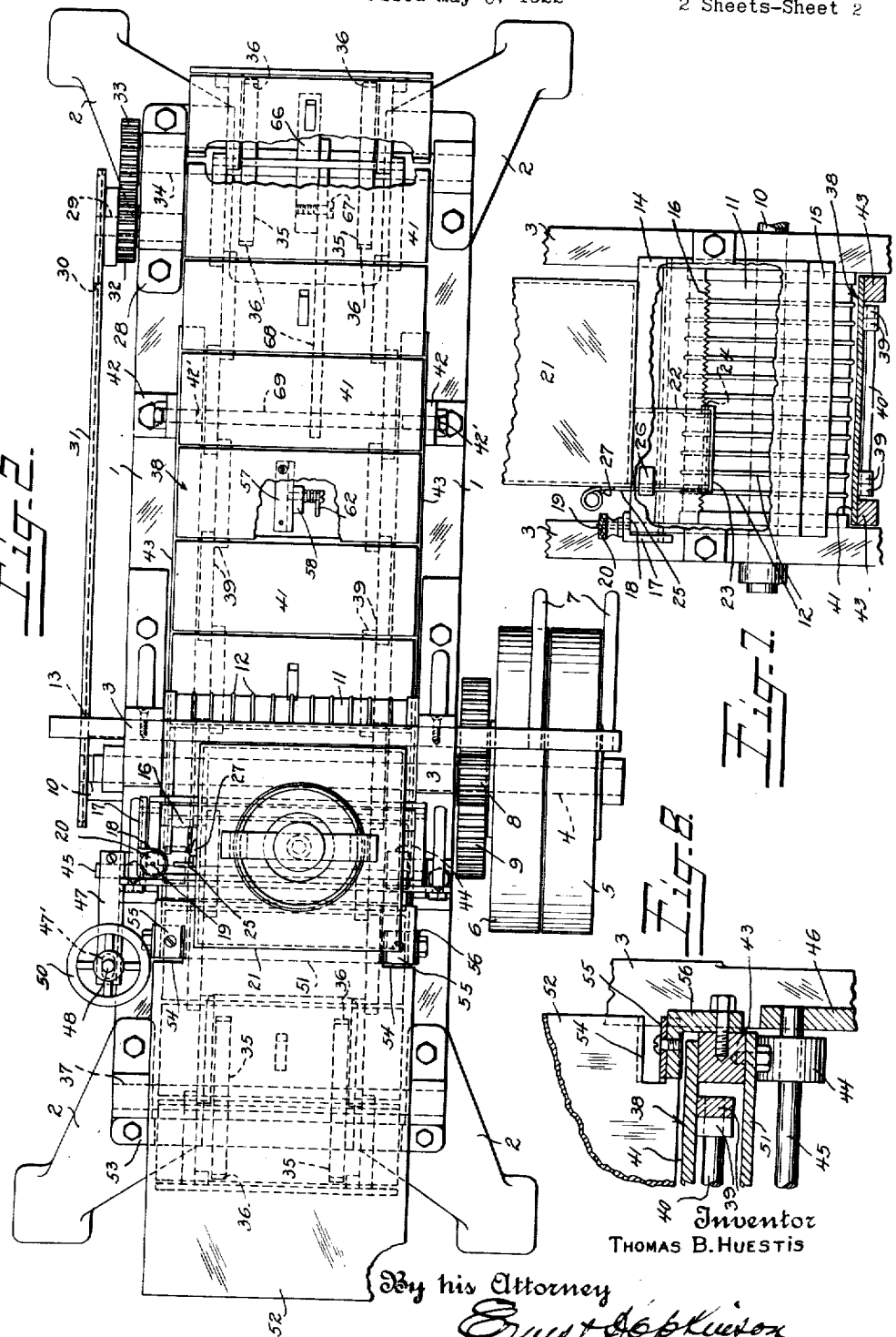

Patented Oct. 5, 1926.

1,602,228

UNITED STATES PATENT OFFICE.

THOMAS B. HUESTIS, OF BRISTOL, RHODE ISLAND, ASSIGNOR TO NATIONAL INDIA RUBBER COMPANY, A CORPORATION OF RHODE ISLAND.

CEMENTING MACHINE.

Application filed May 6, 1922. Serial No. 559,038.

This invention relates to a cementing machine, more particulrly to a machine for cementing insoles or similar articles of fabric or other sheeted material.

In the manufacture of rubber or rubberized articles, particularly footwear, they are usually built up by joining various parts in sheet form by adhesion, which parts become integrally united during the vulcanizing process. Where some of the parts are composed of fabric it is necessary to cement them before the building up operation, in order that they may adhere firmly to the other parts, and it is also desirable to cement parts which are formed of different rubber compositions, in order that they may be more firmly united in vulcanization. It has previously been customary to cement these various parts by hand, which is a laborious and time consuming operation.

An object of my invention is to provide a machine for cementing sheeted articles of fabric or other material.

Another object is to provide a conveyor having an improved means for gripping the articles during their passage through the machine, and for automatically releasing them after the cementing operation.

Another object is to provide coacting pressure means for applying a relatively thick film of cement to an article to be coated.

Still another object is to provide means whereby the cement applying roll may always apply a coating of fresh cement to the article.

For a detailed disclosure of the invention reference is had to the accompanying specification and drawings, in which latter:

Fig. 1 is a longitudinal section through the machine;

Fig. 2 is a plan view with parts broken away;

Fig. 3 is a detail showing one of the grippers just prior to being opened;

Fig. 4 is a similar view showing the gripper in open position to receive an article to be cemented;

Fig. 5 is a view showing the position of a gripper just prior to the release of an article;

Fig. 6 is a similar view showing the gripper after it has been opened;

Fig. 7 is a left hand view partly in section and partly broken away; and

Fig. 8 is a detail section showing the connection of certain of the parts.

Referring to the drawings the numeral 1 designates a base supported by the legs 2, and carrying at an intermediate point the standards 3. A main drive shaft 4 is mounted in the standards and carries at one end the fast and loose pulleys 5 and 6 respectively, on either of which the driving belt may be disposed by means of the belt shifter 7. A gear 8 is also mounted on the shaft 4 adjacent the pulley 6, which gear meshes with a lower gear 9 carried on the shaft 10 mounted in the standards 3. Secured to the shaft 10 between the standards is a cementing roll 11 which is provided with spaced circumferential ridges or projections 12. Also mounted on the shaft 10 outside of the standards 3 is a sprocket 13, the purpose of which will later be explained.

Secured to the standards 3 is a cement reservoir 14 having an inclined bottom 15, which bottom and one of the side walls are cut away to receive a portion of the cementing roll 11, as shown in Fig. 1. The reservoir 14 extends the full length of the cementing roll 11, and has an open top. Pivotally mounted in the end walls of the reservoir is a comb or serrated scraper 16 the teeth of which are adapted to engage the periphery of the cementing roll, adjacent the point where it enters the reservoir. Rigidly attached to the shaft or pivot of the comb 16 is an arm 17 which extends up alongside the wall of the reservoir and at its upper end is bent over horizontally, as shown at 18. Through this horizontal portion freely passes a threaded pin 19 mounted on the wall of the reservoir, and a thumb nut 20 threaded on said pin is adapted to engage the horizontal portion 18 of arm 17 to thereby force the comb 16 against the cementing roll. A portable cement tank 21 rests on top of the reservoir 14 and is provided with a nozzle 22 projecting into the reservoir. The passage of cement from the nozzle is governed by a flat valve 23 pivoted to the nozzle at 24, and at one side the valve is provided with an integral right angle extension 25 forming an operating lever for the valve. This lever extends up along one side of the nozzle, as shown in Fig. 7, and its movement is limited by a confining strap 26. Adjacent the upper end of the lever 25 a small projection or stop 27 is secured to the wall of tank 21, behind which projection the lever may be sprung to hold it in closed position.

A bracket 28 is secured to the forward end of the base 1, in which bracket is mounted a stub shaft 29 carrying at its outer end a sprocket 30 which is driven by the chain 31 from sprocket 13 on the cementing roll shaft 10. The stub shaft also carries a gear 32 meshing with a gear 33 carried by the shaft 34 extending transversely across the base. Mounted in spaced relation on the shaft 34 are a pair of sprockets 35 having the recesses 36 for engagement by a conveyor. At the opposite end of the base a second transverse shaft 37 is mounted which carries a second pair of sprockets 35 in alignment with the first pair. A conveyor table designated generally by the numeral 38 passes over the sprockets 35 at the ends of the base 1. This conveyor comprises two series of links 39, the adjacent links in each series being connected by a pivot rod 40, which rod extends across the conveyor transversely to also form the pivot for the corresponding pair of links in the other series. To each oppositely disposed pair of links 39 a flat table section 41 is secured.

It is desirable that the conveyor table be rigidly supported at the point where the cementing roll coacts with it, and it is also desirable that the table be adjustable with respect to the cementing roll in order to accommodate articles of different thickness, and the following mechanism is provided for accomplishing these purposes. Brackets 42 are secured to the base 1 and to each bracket a table supporting bar 43 is pivotally connected at 42'. It will be noted in Figs. 2, 7 and 8 that the supporting bars 43 are disposed at the outside edges of the conveyor directly beneath the ends of the table sections 41. At a point adjacent its opposite end each supporting bar 43 rests upon an eccentric cam 44 carried by the shaft 45 mounted in brackets 46. Rigidly secured to the shaft 45 is an operating arm 47, through the outer slotted end 47' of which, (Fig. 2), extends a threaded adjusting rod 48 which is pivotally mounted on the base at 49. A small hand wheel 50 is threadedly mounted on the upper end of the rod 48 and engages the upper side of the operating arm 47. A transversely extending gripper opening bar or cam 51 is secured to the ends of the supporting bars 43 on their lower sides, the purpose of which will be later explained in detail.

An inclined spring feed plate 52 for properly positioning the article to be cemented is secured to a bracket 53 mounted on the base 1. Adjacent the lower forward edge of the plate right angle cuts 54 (Fig. 2) are made in each side thereof to provide lugs or ears 55 each of which is bent downwardly and secured to the horizontal portion of an angled bracket 56, the vertical portion of which is secured to the adjacent supporting bar 43. It will be noted in Fig. 8 that the brackets 56 are disposed high enough for their horizontal portions to clear the table sections 41. By the construction above described the conveyor may be adjusted with respect to the cementing roll, but in all positions of adjustment the feed plate and the gripper opening cam 51 are held in fixed relation to the conveyor.

In order that articles to be cemented may be positively held to the conveyor table during the cementing operation the table sections may be provided with gripping or clamping devices. In the present embodiment these devices are shown as applied to alternate table sections, but it is obvious that if desired they may be applied to each section, or to a less number than in the form shown. Each gripper comprises a block 57 secured to the lower side of a table section 41, and on this block the gripper element per se 58 is pivotally mounted. The table section 41 is formed with a slot 59 in which the tapered and curved upper end 60 of the gripper may move. This upper end is normally held in contact with the correspondingly curved rear wall 61 of the slot by means of a coil spring 62 mounted on the pivot of the gripper, one end of the spring bearing against the table section 41 and its other end against a pin 63 on the gripper. The block 57 also carries a stop 64 for limiting the opening movement of the gripper, and the lower end 65 of the gripper projects downwardly in the manner shown in Fig. 3 so that at the proper time it may engage the gripper opening cam 51.

At the forward end of the machine a second gripper opening cam 66 is mounted on the shaft 34 midway thereof but independent of the shaft. In order to hold this cam in fixed position it is secured by a screw 67 to an arm 68, one end of which embraces the shaft 34 and the other end a rod 69 extending between the brackets 42.

In operation the valve on tank 21 is opened to allow the cement to flow in reservoir 14, and the machine started. The operator places an insole 70 or any other article to be cemented on the feed plate 52 with its forward edge projecting beyond the feed plate slightly, as shown in Fig. 4. In the movement of the conveyor the next adjacent gripper upon engaging the gripper opening cam 51 is opened as shown in Fig. 4, and as the lower end 65 of the gripper passes off of the bar 51 its spring urges it into closed position and grips the extreme forward edge of the insole in the manner shown in Fig. 1. As the conveyor carries the insole under the cementing roll the cement is applied to the upper surface of the insole. If the cementing roll 11 were made smooth it would tend to squeeze off the cement from the insole and would also cause the conveyor to become clogged with cement, but by providing the spaced projections 12 on the roll the insole is maintained slightly spaced from the surface of the roll and thereby receives a cement coating of the thickness desired. While ordinarily the thickness of the coating will be varied by merely using a thicker or thinner cement, it may also be varied to a certain extent by adjusting the conveyor upwardly by means of the hand wheel 50 to cause it to hold the insole with greater pressure against the roll 11, thereby causing the insole to enter somewhat into the spaces between the ridges 12. It will be seen that the adjustment of the hand wheel 50 the cams 44 may be caused to raise or lower the supporting bars 43 and thereby vary the distance of the conveyor from the cementing roll. In addition, as the gripper releasing cam 51 and the lower edge of the feed plate 52 are fixedly connected to the supporting bars 43, said parts are always held in the same relation to the conveyor table in any of its positions of adjustment. After passing under the cementing roll the insole moves to the right on the conveyor until it reaches the position shown in Fig. 5, at which time the lower end 65 of the gripper engages the opening cam 66, and releases the edge of the insole, which may then be delivered to a table or to another conveyor. As the grippers are relatively narrow, and engage only the extreme edge of the article to be cemented, the small portion of the surface of the article which does not receive the cement is negligible. After having applied the cement to an article the periphery of the roll 11 again passes into the cement reservoir 14 and any portions of cement remaining thereon and which tend to become thickened are removed by the serrated scraper 16, thereby permitting fresh cement to be applied each time by the roll.

While a specific application of the invention has been described which is particularly adapted for cementing insoles, it is obvious that any other articles in sheet form may be cemented in like manner, and the device is also not limited to the application of cement, but may be used for applying any other desired fluid.

Having thus described my invention, what I claim and desire to protect by Letters Patent is:

1. A cementing machine comprising rotary elements, a conveyor carried thereby having a substantially continuous article supporting surface, cement applying means directly cooperating therewith to coat an article, spaced means carried by said conveyor within its supporting surface and normally cooperating with the conveyor to grip an article, and means disposed in advance and in rear of said cement applying means for automatically releasing said gripping means.

2. A cementing machine comprising rotary elements, a continuously movable conveyor carried thereby having a substantially continuous unobstructed article supporting surface, cement applying means continuously and directly cooperating therewith to coat an article, spaced means carried by said conveyor centrally thereof below said surface for gripping an article, means for guiding an article to the conveyor, and means disposed in advance and in rear of said cement applying means for automatically releasing said gripping means.

3. A cementing machine comprising a conveyor, a coacting cement applying roll disposed at an intermediate point thereon, means for driving said roll, means for varying the pressure between said roll and conveyor, spaced normally closed article gripping means carried by said conveyor, and means disposed at opposite sides of said roll for automatically opening said gripping means.

4. A cementing machine comprising a conveyor table, a cementing roll directly coacting therewith, automatic means disposed below the surface of the table for fixedly securing articles to the table in position to receive cement from said roll in the movement of the table, and means carried by the roll for slightly spacing the body thereof from the article during the cementing.

5. A cementing machine comprising a roll having projections thereon, means for supplying cement thereto, a coacting bodily movable smooth surfaced element, means below the surface thereof for attaching thereto an article to be cemented, and means for moving said element into and out of cooperation with said roll.

6. A cementing machine comprising a conveyor table having an opening therein resiliently actuated means cooperating with a wall or said opening for fixedly securing to the table an article to be cemented, spaced means for opening said securing means, and means disposed between said spaced means for applying cement to the article.

7. A cementing machine comprising a cementing roll, a conveyor table movable past the same, a feed plate coacting with the conveyor in advance of the roll, means for rigidly supporting the table in operative relation to the roll, and means for adjusting said supporting means.

8. A cementing machine comprising a conveyor table, normally closed means thereon for securing thereto an article to be cemented, spaced means for opening said securing means, means disposed between said spaced means for applying cement to the article, and adjustable means for rigidly supporting the table in cooperative relation to said cement applying means.

9. A cementing machine comprising a cementing roll, a conveyor movable past the same, a feed plate coacting with the conveyor in advance of the roll, article gripping devices carried by the conveyor, means for successively opening said devices disposed adjacent the feed plate, and means for varying the relation of said feed plate, conveyor and opening means with respect to said roll.

10. A cementing machine comprising a conveyor table, normally closed article gripping means thereon, a feed plate adjacent the table, means adjacent the plates for opening said gripping means, a cementing device adjacent the table, means for adjusting said feed plate, table and opening means in unison with respect to the cementing device, and additional means for opening the gripping means.

11. A cementing machine comprising a conveyor table, supports pivoted at one end and disposed beneath the table adjacent its edges, means for raising and lowering the opposite free ends of the supports, a feed plate carried at one end by the free ends of the supports, spaced normally closed article grippers carried by the table, means carried by said supports for opening said grippers adjacent the feed plate, a cementing roll cooperating with said table, and means for releasing cemented articles from the table.

12. A cementing machine comprising a link conveyor, sprockets for driving the same, cement applying means disposed at an intermediate point on the conveyor and continuously cooperating therewith, gripping fingers pivotally mounted on spaced links of the conveyor below its operative surface, an actuating arm connected to each finger, resilient means for moving said arm to close said gripping finger, and cam means disposed in advance of the cement applying means for engaging said arm to thereby open the finger.

13. A cementing machine comprising a cement tank, a cementing roll disposed to receive cement therefrom, means for removing previously used cement therefrom, a conveyor movable across said roll, means for adjusting the conveyor toward and from the roll, spaced normally closed article grippers carried by said conveyor, and means for opening each gripper at points in advance of and beyond said roll.

14. A cementing machine comprising a cement tank, a cementing roll having a portion of its periphery disposed within said tank, a scraper within said tank in engagement with said roll, a conveyor movable past said roll, means for adjusting the conveyor toward and from the roll, spaced normally closed article grippers carried by said conveyor, means disposed adjacent one end of the conveyor to open each gripper to receive an article, and means disposed adjacent the other end of said conveyor for again opening each gripper to discharge a cemented article.

15. A cementing machine comprising a cement tank, a cementing roll partly projecting therewith, said roll being provided with circumferential ridges, a serrated scraper in contact with said roll, for removing unused cement from the roll, a conveyor continuously movable past the roll continuously cooperating therewith, and means disposed entirely below the conveyor surface for automatically securing an article to the conveyor in advance of said roll and releasing it beyond said roll.

16. A cementing machine comprising cementing means, a conveyor table cooperating therewith, spaced openings therein each having a curved end wall, spring pressed gripping fingers disposed in said openings below the table surface and cooperating with said walls to grip an article, and means at opposite sides of the cementing means for opening said fingers.

Signed at Bristol in the county of Bristol and State of Rhode Island, this 1st day of May, 1922.

THOMAS B. HUESTIS.

means, means disposed between said spaced means for applying cement to the article, and adjustable means for rigidly supporting the table in cooperative relation to said cement applying means.

9. A cementing machine comprising a cementing roll, a conveyor movable past the same, a feed plate coacting with the conveyor in advance of the roll, article gripping devices carried by the conveyor, means for successively opening said devices disposed adjacent the feed plate, and means for varying the relation of said feed plate, conveyor and opening means with respect to said roll.

10. A cementing machine comprising a conveyor table, normally closed article gripping means thereon, a feed plate adjacent the table, means adjacent the plates for opening said gripping means, a cementing device adjacent the table, means for adjusting said feed plate, table and opening means in unison with respect to the cementing device, and additional means for opening the gripping means.

11. A cementing machine comprising a conveyor table, supports pivoted at one end and disposed beneath the table adjacent its edges, means for raising and lowering the opposite free ends of the supports, a feed plate carried at one end by the free ends of the supports, spaced normally closed article grippers carried by the table, means carried by said supports for opening said grippers adjacent the feed plate, a cementing roll cooperating with said table, and means for releasing cemented articles from the table.

12. A cementing machine comprising a link conveyor, sprockets for driving the same, cement applying means disposed at an intermediate point on the conveyor and continuously cooperating therewith, gripping fingers pivotally mounted on spaced links of the conveyor below its operative surface, an actuating arm connected to each finger, resilient means for moving said arm to close said gripping finger, and cam means disposed in advance of the cement applying means for engaging said arm to thereby open the finger.

13. A cementing machine comprising a cement tank, a cementing roll disposed to receive cement therefrom, means for removing previously used cement therefrom, a conveyor movable across said roll, means for adjusting the conveyor toward and from the roll, spaced normally closed article grippers carried by said conveyor, and means for opening each gripper at points in advance of and beyond said roll.

14. A cementing machine comprising a cement tank, a cementing roll having a portion of its periphery disposed within said tank, a scraper within said tank in engagement with said roll, a conveyor movable past said roll, means for adjusting the conveyor toward and from the roll, spaced normally closed article grippers carried by said conveyor, means disposed adjacent one end of the conveyor to open each gripper to receive an article, and means disposed adjacent the other end of said conveyor for again opening each gripper to discharge a cemented article.

15. A cementing machine comprising a cement tank, a cementing roll partly projecting therewith, said roll being provided with circumferential ridges, a serrated scraper in contact with said roll, for removing unused cement from the roll, a conveyor continuously movable past the roll continuously cooperating therewith, and means disposed entirely below the conveyor surface for automatically securing an article to the conveyor in advance of said roll and releasing it beyond said roll.

16. A cementing machine comprising cementing means, a conveyor table cooperating therewith, spaced openings therein each having a curved end wall, spring pressed gripping fingers disposed in said openings below the table surface and cooperating with said walls to grip an article, and means at opposite sides of the cementing means for opening said fingers.

Signed at Bristol in the county of Bristol and State of Rhode Island, this 1st day of May, 1922.

THOMAS B. HUESTIS.

Certificate of Correction.

It is hereby certified that in Letters Patent No. 1,602,228, granted October 5, 1926, upon the application of Thomas B. Huestis, of Bristol, Rhode Island, for an improvement in " Cementing Machines," errors appear in the printed specification requiring correction as follows: Page 3, line 3, for the misspelled word " squeze " read *squeeze;* line 19, after the word " that " insert the word *by*, and line 115, claim 6, for the word " or " read *of;* page 4, line 19, claim 10, for the word " plates " read *plate*, and line 77, claim 15, for the word " therewith " read *therewithin;* and that the said Letters Patent should be read with these corrections therein that the same may conform to the record of the case in the Patent Office.

Signed and sealed this 23d day of November, A. D. 1926.

[SEAL.]

M. J. MOORE,
*Acting Commissioner of Patents.*

Certificate of Correction.

It is hereby certified that in Letters Patent No. 1,602,228, granted October 5, 1926, upon the application of Thomas B. Huestis, of Bristol, Rhode Island, for an improvement in "Cementing Machines," errors appear in the printed specification requiring correction as follows: Page 3, line 3, for the misspelled word "squeze" read *squeeze;* line 19, after the word "that" insert the word *by*, and line 115, claim 6, for the word "or" read *of;* page 4, line 19, claim 10, for the word "plates" read *plate*, and line 77, claim 15, for the word "therewith" read *therewithin;* and that the said Letters Patent should be read with these corrections therein that the same may conform to the record of the case in the Patent Office.

Signed and sealed this 23d day of November, A. D. 1926.

[SEAL.]
M. J. MOORE,
*Acting Commissioner of Patents.*